United States Patent
Janik et al.

(10) Patent No.: US 7,218,474 B2
(45) Date of Patent: May 15, 2007

(54) ASSEMBLY RAIL CORNERS SHAPED TO REDUCE SHOCK

(75) Inventors: Peter Roman Janik, Shakopee, MN (US); Matthew Wesley Jones, Bloomington, MN (US); Glen Edward Pierce, Oklahoma City, OK (US); Fei (Peter) Wang, Savage, MN (US); Liyang (Leon) Zhao, Maple Grove, MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 443 days.

(21) Appl. No.: 10/865,337

(22) Filed: Jun. 10, 2004

(65) Prior Publication Data

US 2005/0275966 A1   Dec. 15, 2005

(51) Int. Cl.
*G11B 33/14* (2006.01)
(52) U.S. Cl. ................................ 360/97.02
(58) Field of Classification Search .......... 360/97.01, 360/97.02
See application file for complete search history.

(56) References Cited

U.S. PATENT DOCUMENTS

| | | | |
|---|---|---|---|
| 5,394,306 A | 2/1995 | Koenck | |
| 5,552,946 A | 9/1996 | Bicknese | |
| 5,703,734 A | 12/1997 | Berberich | |
| 5,751,514 A | 5/1998 | Hyde | |
| 5,757,580 A | 5/1998 | Andress | |
| 5,760,998 A | 6/1998 | Berberich | |
| 5,965,249 A | 10/1999 | Sutton | |
| 5,982,580 A | 11/1999 | Woldemar | |
| 6,021,041 A | 2/2000 | Genix | |
| 6,022,224 A | 2/2000 | Peters | |
| 6,023,392 A | 2/2000 | Kim | |
| 6,052,255 A | 4/2000 | Kawabe | |
| 6,064,567 A | 5/2000 | Cheng | |
| 6,078,498 A | 6/2000 | Eckerd | |
| 6,252,768 B1 | 6/2001 | Lin | |
| 6,272,011 B1 | 8/2001 | Chen | |
| 6,275,353 B1 * | 8/2001 | Briggs | 360/97.02 |
| 6,288,866 B1 | 9/2001 | Butler | |
| 6,392,982 B1 | 5/2002 | Kobayashi | |
| 6,417,985 B1 | 7/2002 | Noda | |
| 6,473,263 B2 | 10/2002 | Jang | |
| 6,487,039 B1 | 11/2002 | Bernett | |
| 6,498,719 B1 | 12/2002 | Bridges | |
| 6,545,865 B2 | 4/2003 | Albrecht et al. | |
| 6,583,950 B2 | 6/2003 | Yoshid | |
| 6,597,533 B1 * | 7/2003 | Tanishima | 360/99.06 |
| 6,822,858 B2 * | 11/2004 | Allgeyer et al. | 361/685 |
| 7,012,805 B2 * | 3/2006 | Shah et al. | 361/685 |
| 2002/0057522 A1 | 5/2002 | Bernett | |

* cited by examiner

*Primary Examiner*—A. J. Heinz
(74) *Attorney, Agent, or Firm*—Westman, Champlin & Kelly P.A.

(57) ABSTRACT

An assembly includes a housing with a base. A mounting pad is positioned on the base. The assembly also includes a micromechanical device coupled to the mounting pad. First and second side rails extend from the base to form first and second rail corners. The first and second rail corners are subject to striking a surface. The first and second rail corners have first and second elevations that are uneven to reduce impacts reaching the micromechanical device.

27 Claims, 10 Drawing Sheets

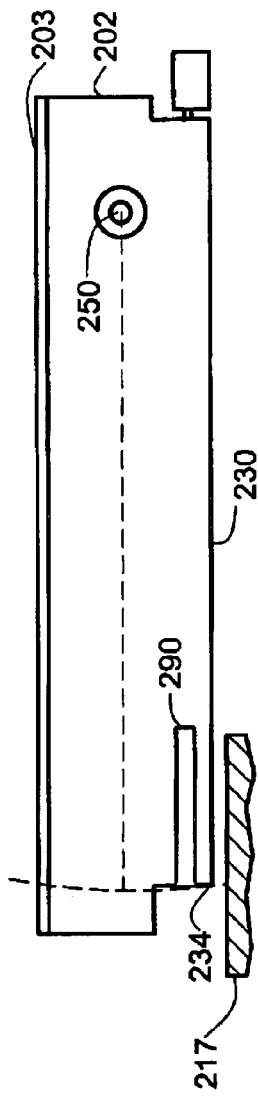
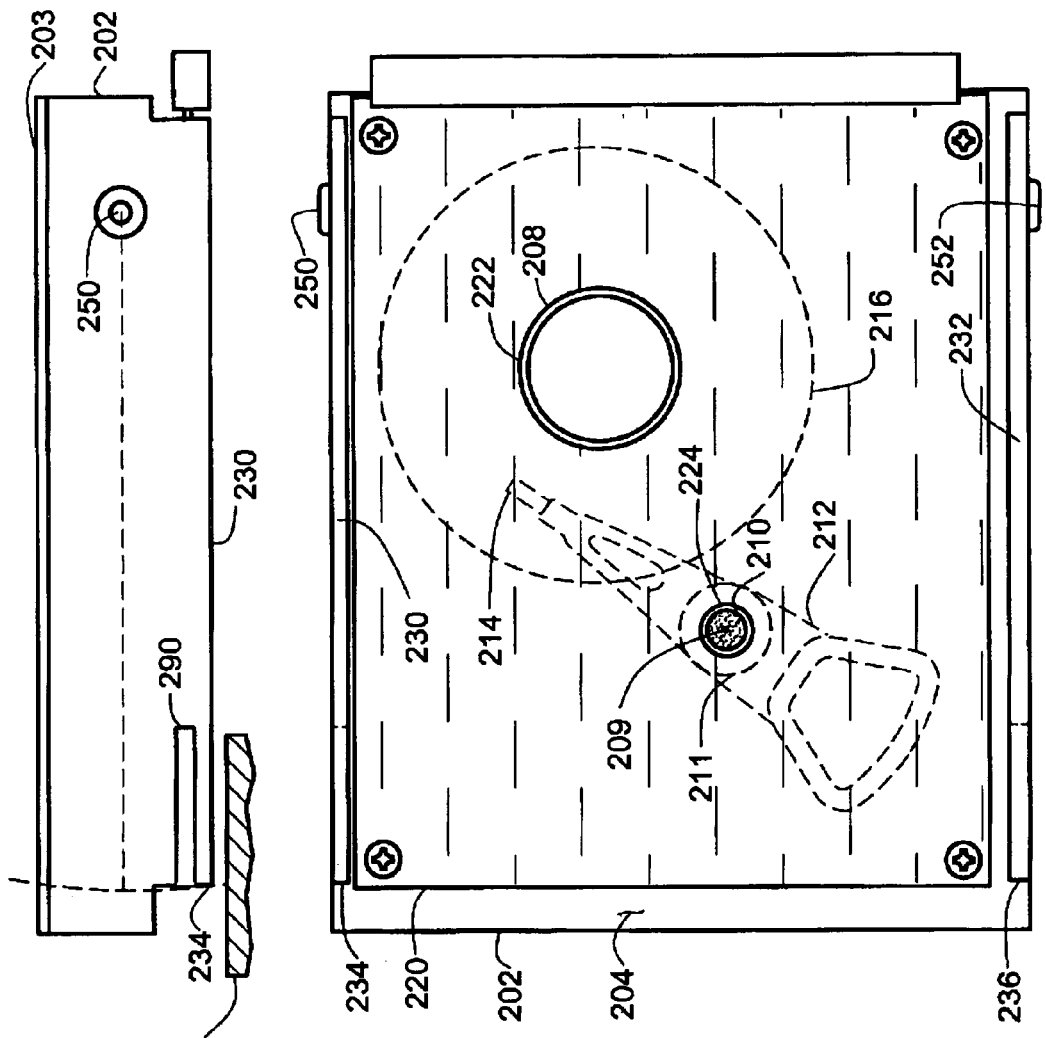
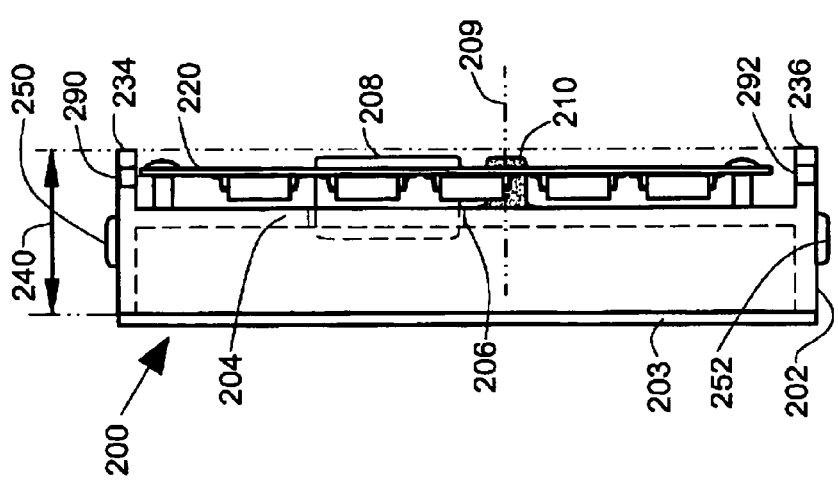

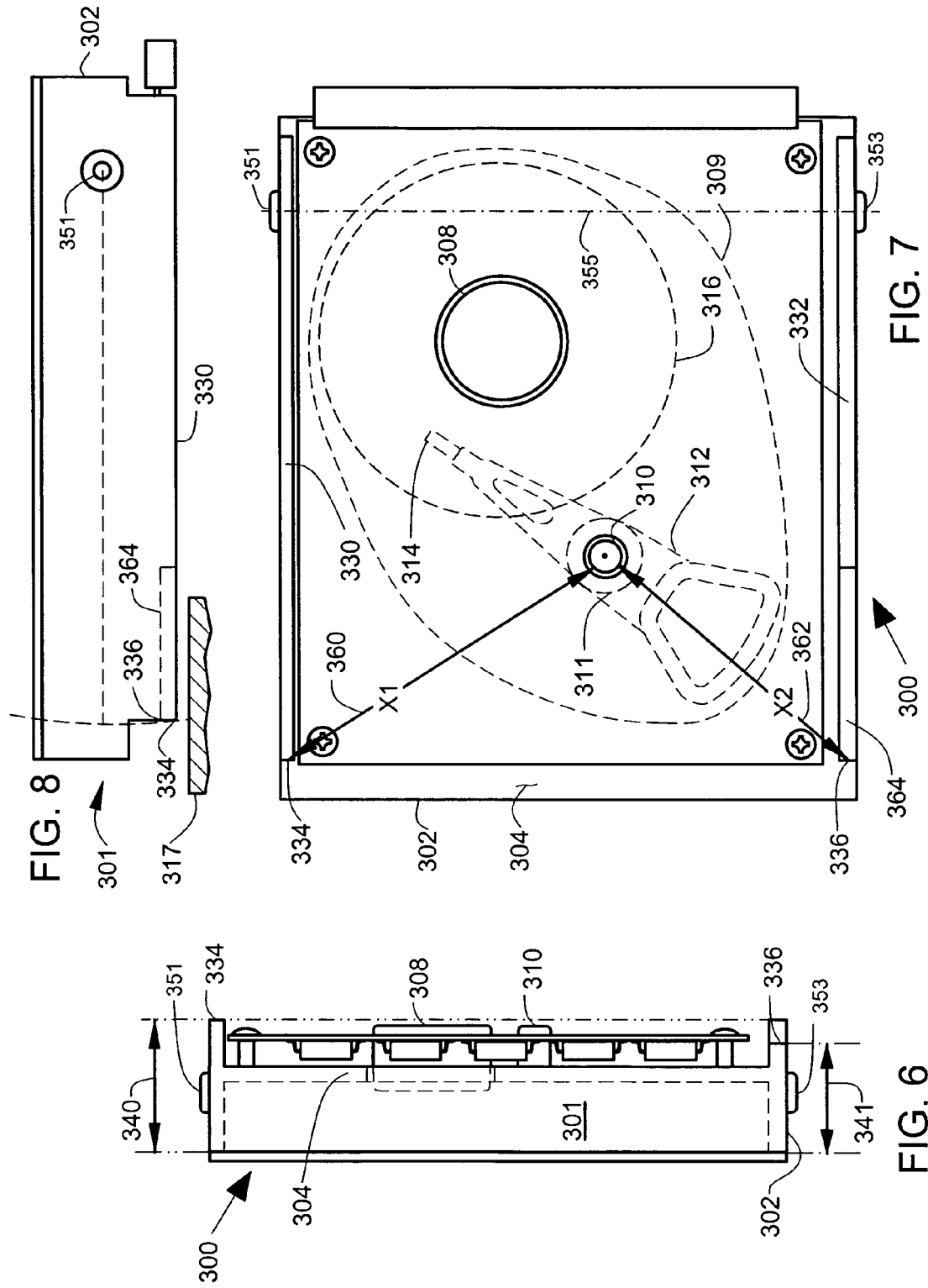

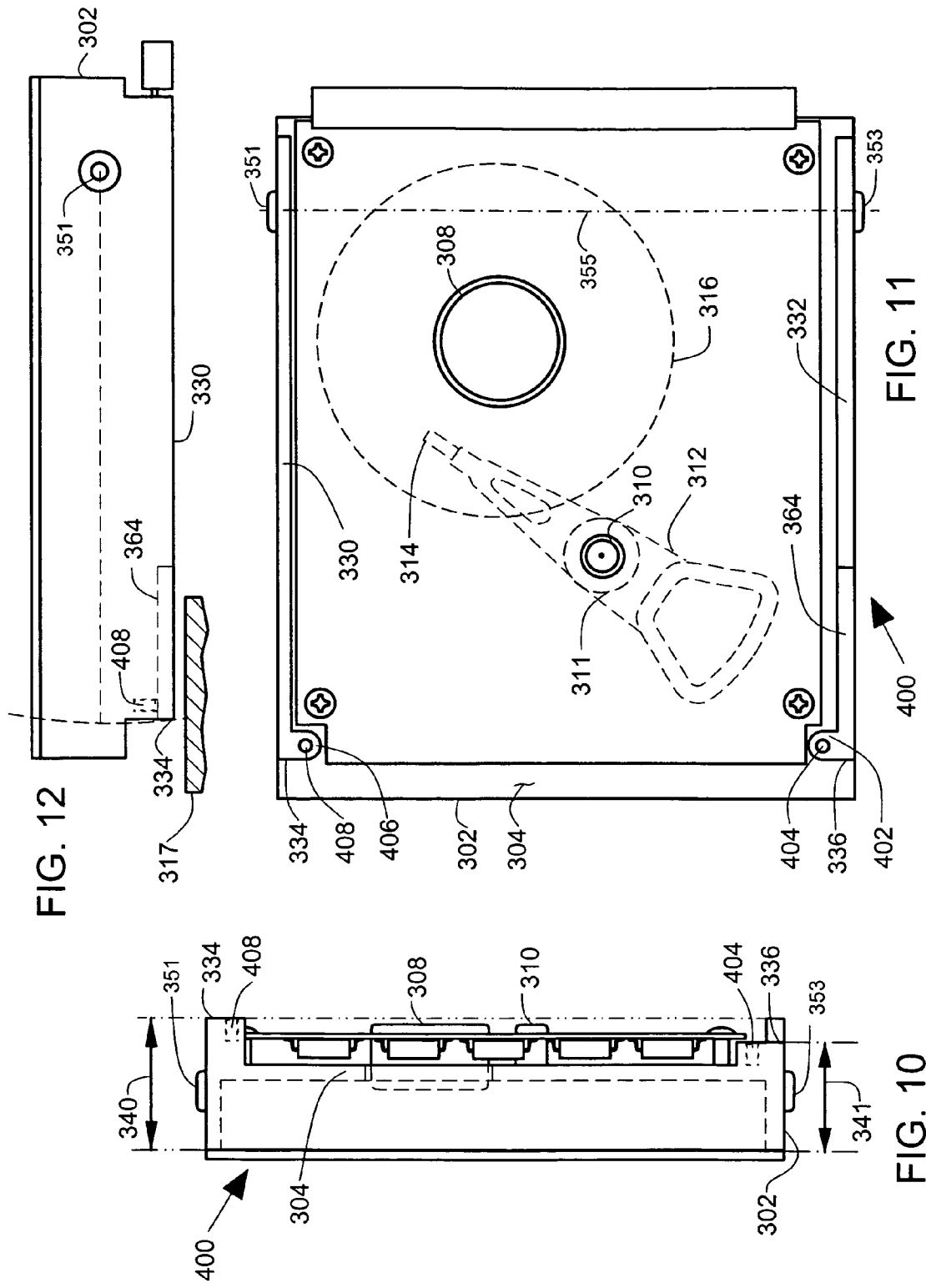

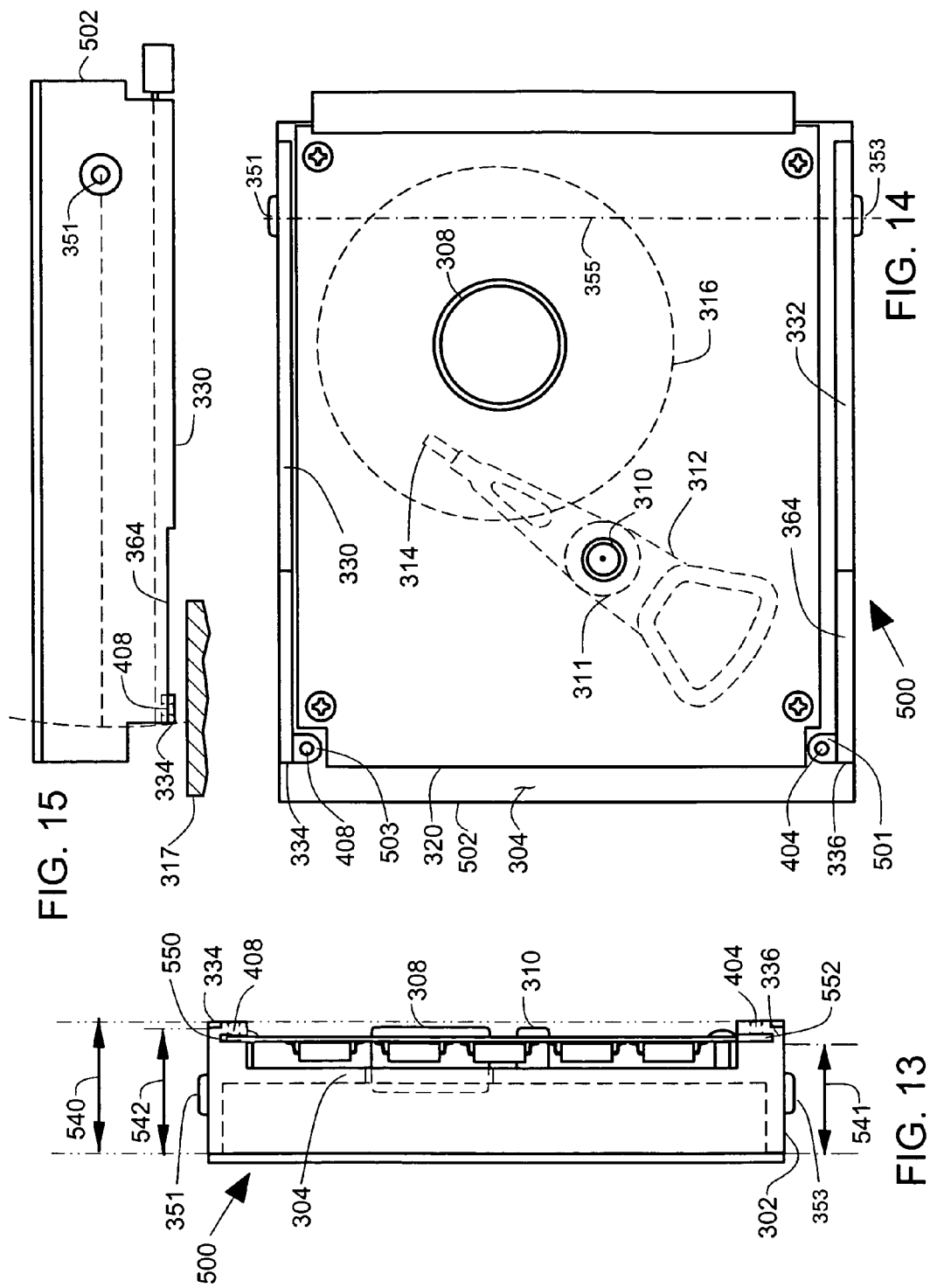

ASSEMBLY RAIL CORNERS SHAPED TO REDUCE SHOCK

FIELD OF THE INVENTION

The present invention relates generally to protecting delicate mechanical components from damage due to mechanical shock, and more particularly, but not by way of limitation, to protecting discs and heads in disc drives from shock damage.

BACKGROUND OF THE INVENTION

Disc drives include delicate mechanical components that can be damaged by shock if a disc drive is dropped on a hard surface during manufacturing, testing or installing the disc drive in a computer. In particular, disc drives include read/write heads that are mounted on delicate mechanical suspensions to access disc surfaces. When there is mechanical shock or vibration, the read/write heads can bounce on the disc surfaces. The bouncing can damage the disc surfaces, the read/write heads or both.

Many disc drives include side rails that protrude from a bottom side of a disc drive housing. It is found that damage to discs or heads from a head slap event is often traceable to shocks that occur when an end of a disc drive is dropped and corners of the metal side rails impact a hard surface. The head temporarily separates from the disc and then slaps back on the disc.

A method and apparatus are needed to reduce head slap or other damage to mechanical components in a housing with side rails when corners of the side rails impact a hard surface. Embodiments of the present invention provide solutions to these and other problems, and offer other advantages over the prior art.

SUMMARY OF THE INVENTION

Disclosed is an assembly that includes a housing having a base. A mounting pad is positioned on the base. The assembly includes a micromechanical device coupled to the mounting pad.

The assembly also includes first and second side rails extending from the base to form first and second rail corners. The first and second rail corners are subject to striking a surface. The first and second rail corners has first and second elevations that are uneven to reduce impacts reaching the micromechanical device.

Other features and benefits that characterize embodiments of the present invention will be apparent upon reading the following detailed description and review of the associated drawings.

BRIEF DESCRIPTION OF THE DRAWINGS

FIGS. 2–4 schematically illustrate a disc drive assembly with rail corners.

FIGS. 6–8 schematically illustrate a first embodiment of an assembly with an elevational step on a rail corner.

FIGS. 10–12 schematically illustrate a second embodiment of an assembly with an elevational step on a rail corner.

FIG. 13–15 schematically illustrate a third embodiment of an assembly with protruding, cantilevered lugs.

DETAILED DESCRIPTION OF ILLUSTRATIVE EMBODIMENTS

In the embodiments illustrated in FIGS. 6–18, an assembly includes one or more micromechanical devices that can be damaged by mechanical shock such as head slap. A micromechanical device is mounted on a mounting pad on a base of a housing. Side rails extend from the base to form rail corners that can be accidentally dropped and strike a surface such as a table. The rail corners have elevations that are uneven to reduce head slap damage to the micromechanical assembly when the rail corners drop and strike a surface. In one embodiment, an elevational step thins one of the rails so that shock impulses from the rails arrive at the mounting pad at different times and tend to interfere and cancel one another. In another embodiment, the rail corner shape includes cantilevered mounting lugs that protrude or are uneven relative to the adjacent rails to deflect and soften the impacts by spreading the impacts out over time. If needed, the mounting lugs can also have uneven elevations relative to one another. Head slap damage to the micromechanical device from impacts to the rails is reduced.

Figure 1:
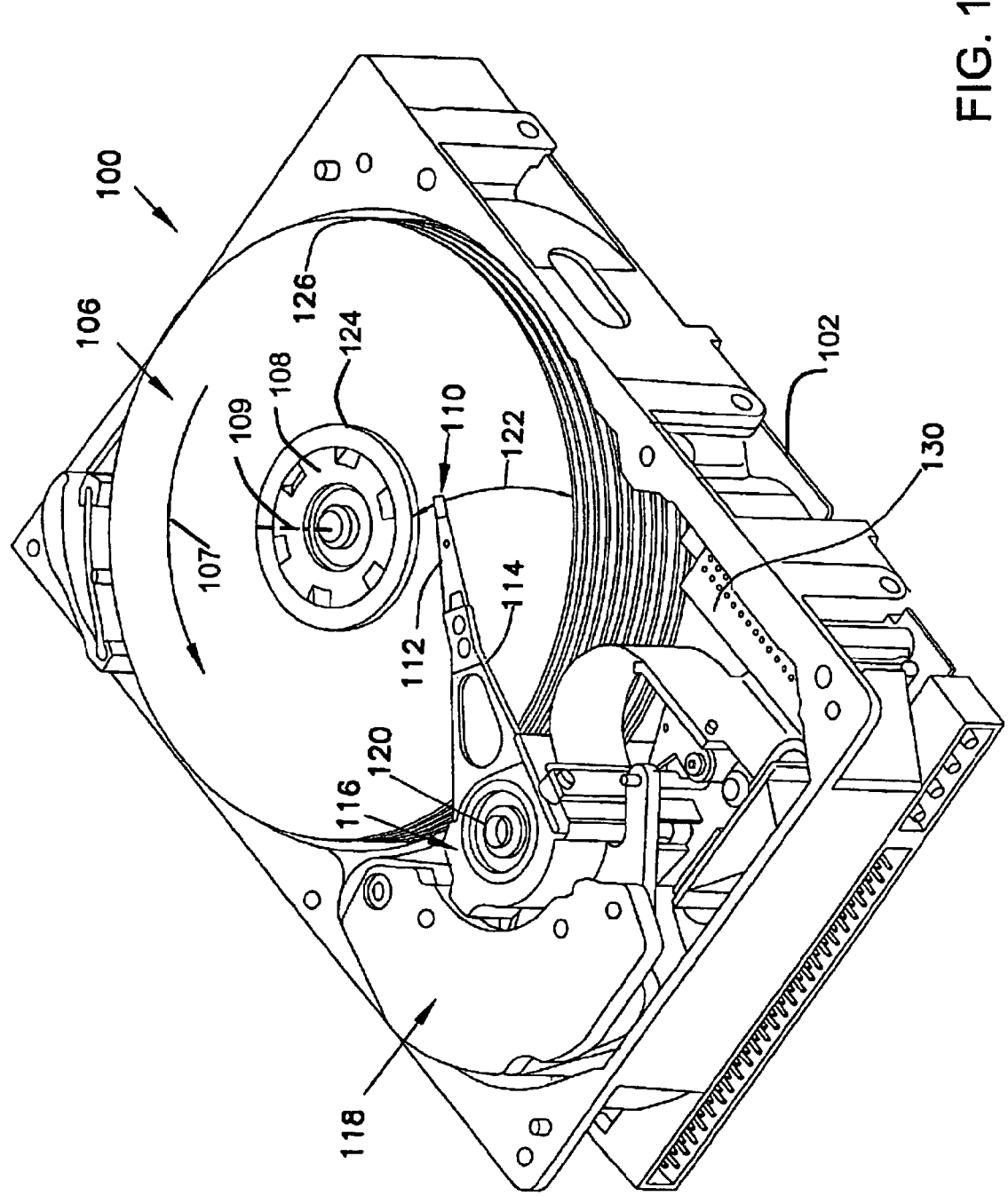
FIG. 1 is an oblique view of a disc drive.

FIG. 1 illustrates an oblique view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes one or more individual discs, which are mounted for co-rotation in a direction indicated by arrow 107 about central axis 109. Each disc surface has an associated disc read/write head slider 110 which is mounted to disc drive 100 for communication with the disc surface. In the example shown in FIG. 1, sliders 110 are supported by suspensions 112 which are in turn attached to track accessing arms 114 of an actuator 116. The actuator 116 shown in FIG. 1 is of the type known as a rotary moving coil actuator and includes a voice coil motor (VCM), shown generally at 118. Voice coil motor 118 rotates actuator 116 with its attached read/write heads 110 about a pivot shaft 120 to position read/write heads 110 over a desired data track along an arcuate path 122 between a disc inner diameter 124 and a disc outer diameter 126. Voice coil motor 118 is driven by electronics 130 based on signals generated by read/write heads 110 and a host computer (not shown). The pivot shaft 120 mounts to a mounting pad on a base of the disc drive.

FIGS. 2–4 schematically illustrates a disc drive assembly 200 that does not have rail corners shaped to reduce shock. FIG. 2 illustrates a first end view of the disc drive 200. FIG. 3 illustrates a bottom view of the disc drive 200. FIG. 4 illustrates a side view of the disc drive assembly 200.

The disc drive assembly 200 includes a die cast housing 202 used for mounting various disc drive components, and a cover 203. The die cast housing 202 includes a base 204 that is generally planar, but includes a through hole 206 for mounting a spindle motor 208. The die cast housing also includes a mounting pad 210 for mounting a hub 211 of a rotary moving voice coil actuator arm 212. The mounting pad 210 (which is illustrated in FIGS. 2–3 with a stippled surface) is a generally round cylindrical protrusion from the base 204. The mounting pad 210 typically has a central bore along an axis 209 for receiving an pivot shaft such as the pivot shaft 120 shown in FIG. 1. A read/write head 214 is suspended on an end of the actuator arm 212. The read/write head 214 is supported by a delicate mechanical suspension on a media surface of a disc 216 that is spun by the spindle motor 208. The read/write head 214 and the disc 216 are subject to head slap damage from shock when the disc drive assembly is dropped on a surface 217.

A printed circuit board (PCB) 220 is mounted on a bottom side of the disc drive assembly 200. The spindle motor 208 projects through a round hole 222 in the printed circuit board 220. The mounting pad 210 projects through a round hole 224 in the printed circuit board 220.

In order to protect the printed circuit board (PCB) 220, the spindle motor 208 and the mounting pad 210 from direct impact damage, side rails 230, 232 extend from the base 204 to form rail corners 234, 236 with substantially the same corner elevation 240 for both rail corners 234, 236. The corner elevation 240 is the same on both side rails 230, 232 so that the disc drive will rest in a level position when the side rails 230, 232 rest on a level surface. Bottom surfaces of the side rails 230, 232 are substantially flat and level. The rails 230, 232 include grooves 290, 292 which are cut into the relatively large rails 230, 232 which are partially effective to reduce impacts. When efforts are made to reduce or scale down the overall size of the disc drive 200 as technology advances, it is found that grooves 290, 292 become so thin that they are ineffective in smaller form factor drives such as those with a form factor of 2.5 inch and smaller. For smaller form factor drives, the grooves can't be used for impact protection and another method is needed to protect smaller form factor drives from impacts.

In typical handling and installation setting, the disc drive assembly is pivotally mounted (typically by screws) at holes 250, 252 and can rotate or pivot around an axis passing through the holes 250, 252. As the disc drive assembly pivots, the rail corners 234, 236 can impact the level surface 217 at substantially the same time. The impacts at the rail corners 234, 236 are transmitted through the base 204 to the mounting pad 210. The mounting pad 210, in turn, transmits the impacts to the hub 211 and the actuator arm 212. The actuator arm 212 vibrates due the impact, and the read/write head 214, which is mounted on the actuator arm 212, also vibrates. As the read/write head 214 vibrates, it bounces on the disc 216, causing head slap damage to the disc 216, the read/write head 214 or both, in spite of the presence of the grooves 290, 292. In smaller form factor drives, the grooves 290, 292 can't be used, and damage becomes more likely.

As described in more detail below in connection with FIG. 5, it is found that oscillatory impacts from the rail corners 234, 236 are transmitted through the base 204 and arrive at the mounting pad 210 such that the largest oscillations tend to be in phase and add, increasing the bouncing of the read/write head 214.

Figure 5:
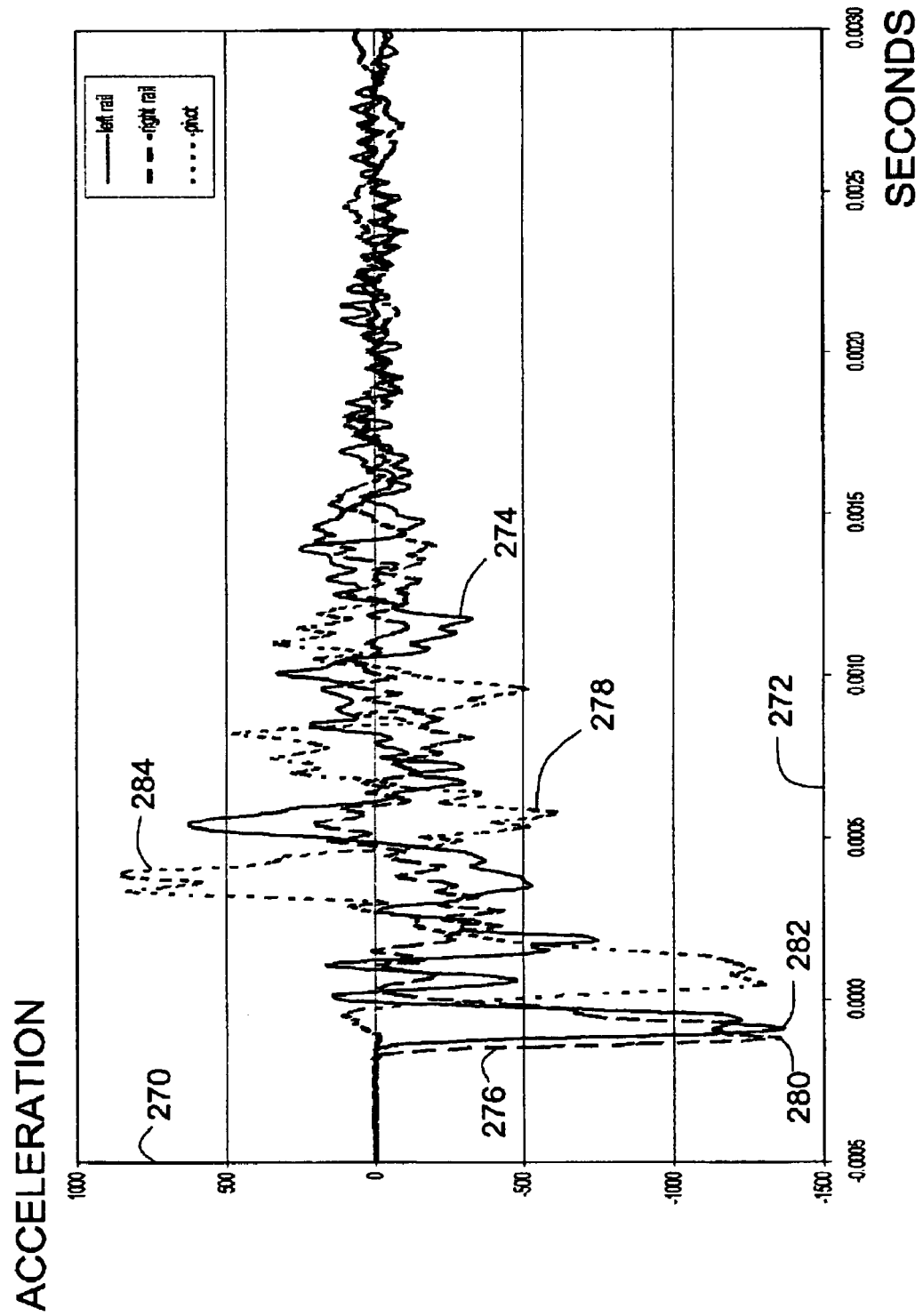
FIG. 5 illustrates a graph of accelerations due to impacts in a drive with rail corners that are not shaped to reduce shock.

FIG. 5 illustrates a graph of accelerations due to impacts in a drive with rail corners that are not shaped to reduce shock. A disc drive is mounted in a test fixture on a pivotal axis (for example, along a line passing through mounting holes 250, 252 in FIGS. 2–4). The end of the disc drive is allowed to drop from a horizontal position (such as shown in FIG. 4), through an angle of 45 degrees until the rail corners 234, 236 strike a flat beveled surface (not illustrated). Three accelerometers are mounted to the disc drive at locations adjacent the rail corners 234, 236 and mounting pad 210 and outputs of the accelerometers are scaled for easy comparison and displayed on the oscillogram illustrated in FIG. 5.

In FIG. 5, a vertical axis 270 represents acceleration as sensed by three accelerometers mounted to the disc drive that does not have rail corners that are shaped to reduce shock. A horizontal axis 272 represents time in seconds. A solid line 274 represents acceleration sensed at a first (left) rail corner. A coarsely dashed line 276 represents acceleration sensed at a second (right) rail corner. A finely dashed line 278 represents acceleration sensed at a mounting pad (actuator arm pivot).

As can be seen from FIG. 5, there is are impact (acceleration) peaks 280, 282 at the rail corners that are essentially simultaneous. The impact peaks 280, 282 travel through a base to the mounting pad and interfere constructively to produce a large impact peak 284 at the mounting pad. The large impact peak 284 is large enough to damage a micromechanical device mounted to the mounting pad. As described below in connections with embodiments described in FIGS. 6–18, this problem with damage to a micromechanical device from bouncing (head slap) is substantially reduced by shaping rail corners to reduce shock.

FIGS. 6–8 schematically illustrate a first embodiment of an assembly 300. The assembly 300 comprises a housing 302 including a base 304 and a mounting pad 310 on the base 304 adjacent a first end 301 of the assembly 300. A micromechanical device 309 couples via a pivot shaft to the mounting pad 310. As illustrated in this example, the assembly 300 comprises a disc drive assembly, however, assembly 300 can take a variety of forms other than a disc drive assembly, dependent on the application. As also illustrated in this example, the micromechanical device 309 comprises disc drive components 311, 312, 314 316 (discussed below), however, micromechanical device 309 can take a variety of forms other than disc drive components, depending on the application. The assembly 300 is pivotally mounted (typically by screws) at holes 351, 353 and can rotate or pivot around an axis 355 passing through the holes 351, 353.

In the example of FIGS. 6–8, a hub 311 of a rotary moving voice coil actuator arm 312 is rotationally mounted to the mounting pad 310. A read/write head 314 is suspended on an end of the actuator arm 312. The read/write head 314 is supported on a delicate mechanical suspension on a media surface of a disc 316 that is spun by a spindle motor 308. The read/write head 314 and the disc 316 are subject to damage from shock (head slap) when the disc drive assembly is dropped on a surface 317.

The assembly 300 also includes first and second side rails 330, 332 extending from the base 304 to form first and second rail corners 334, 336 subject to impacts upon striking a surface. The first rail corner 334 is mechanically coupled to the mounting pad 310 through the base 304 along a path 360 with a path length X1. The second rail corner 336 is mechanically coupled to the mounting pad 310 through the base 304 along a path 362 with a path length X2. Impacts travel through the base 304 at the speed of sound in the material used for the base. In an aluminum base, for example, a difference in path length (X1–X2) of 1 millimeter will cause simultaneous impacts at rail corners 334, 336 to reach the mounting pad separated by a time difference by about 0.0002 seconds (0.2 milliseconds). It is found that impacts typically have damped oscillatory waveshapes, and can interfere with each other to either add or subtract at a particular location on the base 304. When the periods of the damped oscillations from the impacts are close to the time difference due to path lengths X1 and X2, the initial oscillations (which are largest) can add at the mounting pad 310 and damage the micromechanical assembly 309. To reduce this problem, the second rail corner 336 has its shape adjusted to control relative times at which impacts reach the micromechanical device 309 which is mounted to the mounting pad 310. There is unevenness between the second rail corner 336 and the first rail corner 334. A portion of the second rail 332 includes an elevational step 364, which is shown enlarged in FIGS. 6–8 for clarity. The elevational step 364 thins a portion of the second rail 332. The elevational step 364 extends to the second rail corner 336. When the first end 301 is dropped, the first rail corner 334 strikes a surface 317 before the second rail corner strikes the surface 317. The first rail corner 334 has a first rail elevation 340 and the second rail corner 336 has a second rail elevation 341. The elevational step 364 is adjusted so the rail corners 334, 36 are uneven and so that impacts at the first rail corner 334 and the second rail corner 336 are not simultaneous. The magnitude of the step is adjusted so that the impacts from the rail corners 334, 336 tend to have a cancellation effect when the impacts reach the mounting pad 310. This cancellation reduces the peak amplitudes of the impacts on the micromechanical assembly 309 and reduces impact damage. The first rail corner 334 has a first corner elevation 340 and the second rail corner 336 has a second rail corner elevation 341. A spacing difference between the first and second rail corner elevations controls the relative times of impacts. In a preferred arrangement, the spacing difference is in the range of 0.125–0.250 millimeters (0.005 to 0.010 inch). Only shaping of a rail end is needed, and there is no need to add additional components to the assembly. 300 to protect the micromechanical device 309 from this kind of shock damage.

Figure 9:
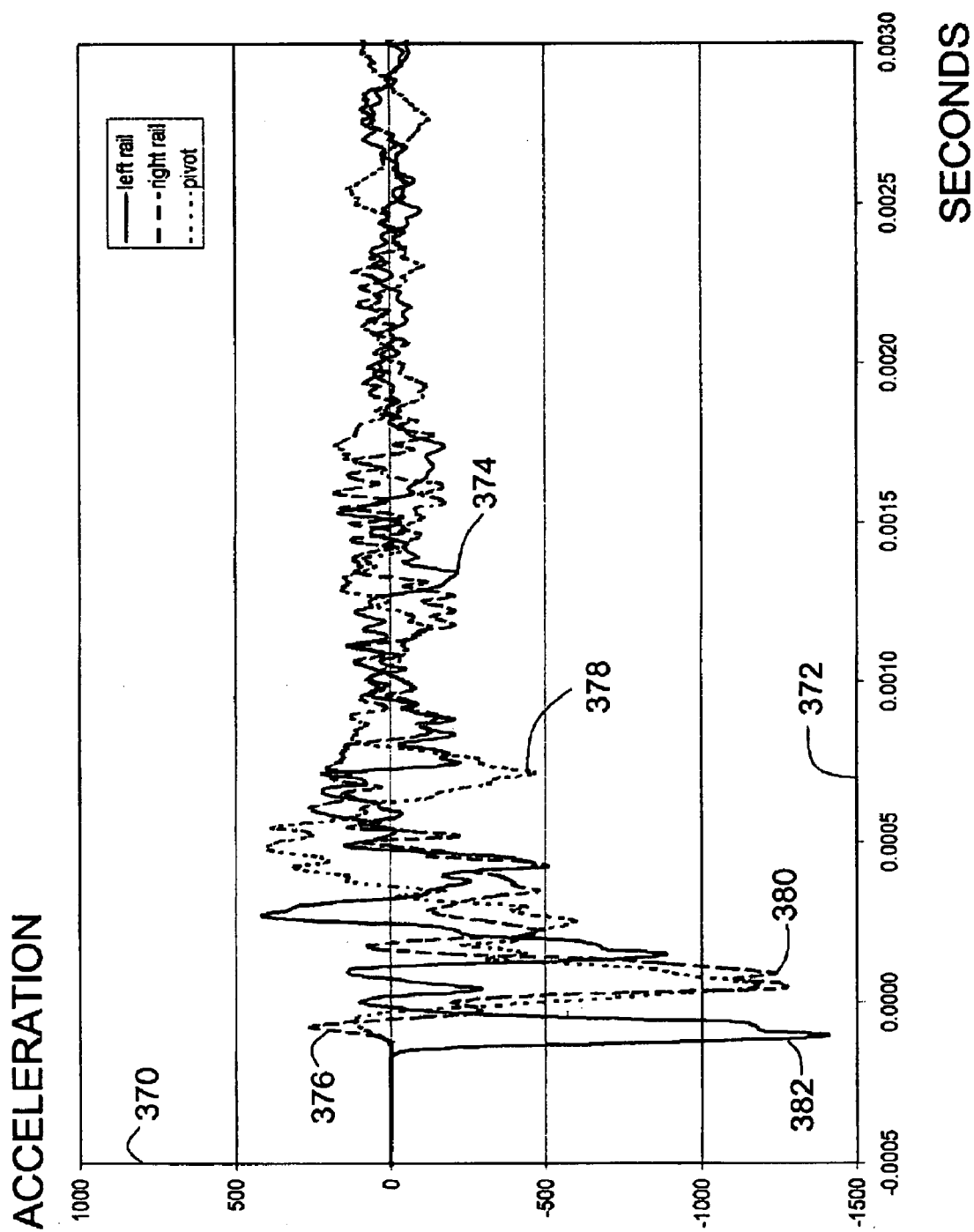
FIG. 9 illustrates a graph of accelerations due to impact on an assembly with an elevations step on a rail corner.
Figure 16:
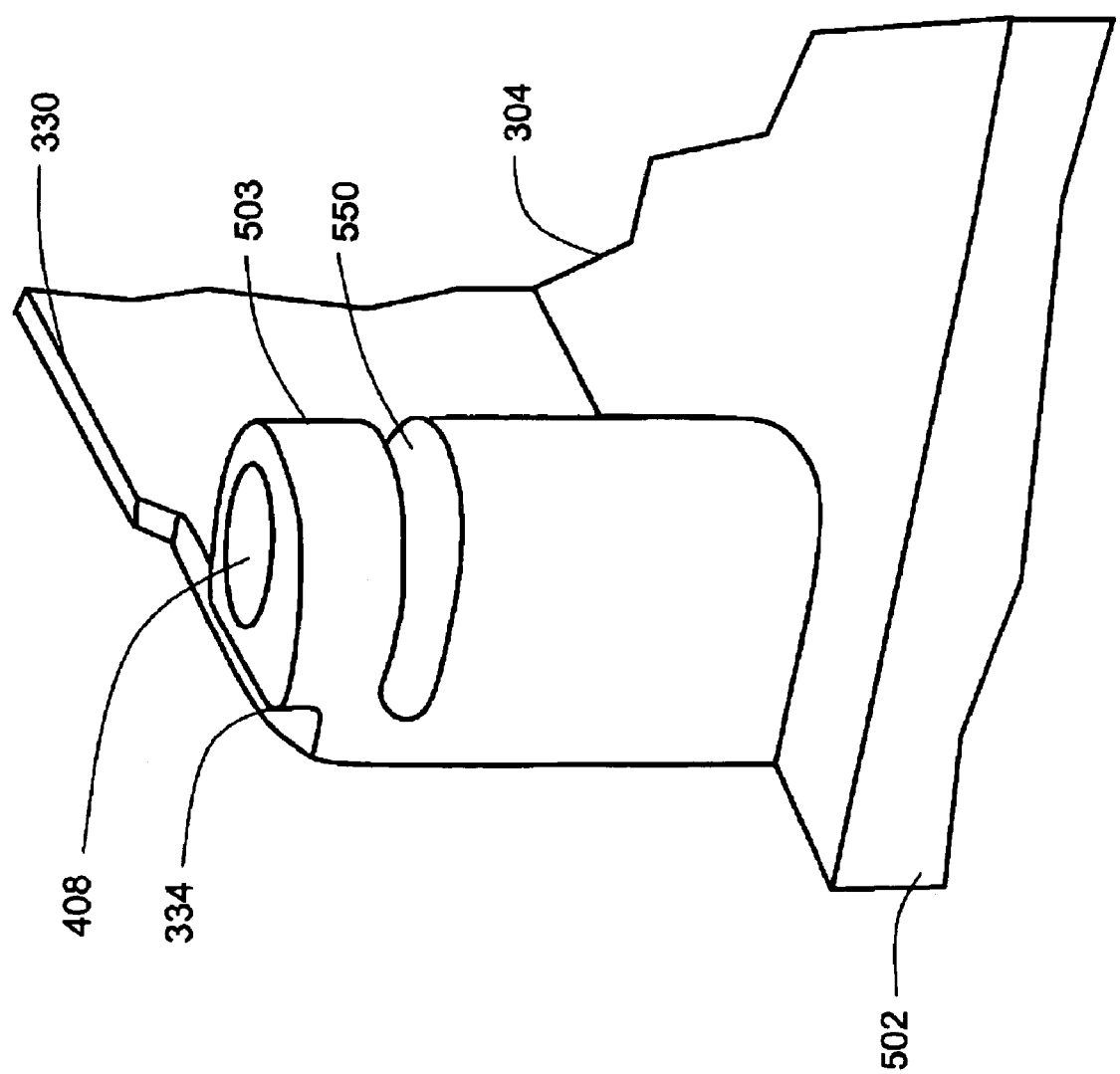
FIG. 16 illustrates an enlarged oblique view of a the rail corner and lug illustrated in FIGS. 13–15.

FIG. 9 illustrates a graph of accelerations due to impact on an assembly with an elevational unevenness between rail corners. The data in FIG. 9 is comparable to the data in FIG. 5. In FIG. 9, a vertical axis 370 represents acceleration as sensed by three accelerometers mounted to the disc drive. A horizontal axis 372 represents time in seconds. A solid line 374 represents acceleration sensed at a first (left) rail corner. A coarsely dashed line 376 represents acceleration sensed at a second (right) rail corner. A finely dashed line 378 represents acceleration sensed at a mounting pad (actuator arm pivot).

As can be seen from FIG. 9, there are impact (acceleration) peaks 380, 382 at the rail corners that are not simultaneous, but are instead spaced apart in time due to elevational unevenness. The impact peaks 380, 382 travel through a base to the mounting pad and interfere to provide cancellation at the mounting pad. There is no large impact peak at the mounting pad such as impact peak 284 described above in connection with FIG. 5. In FIG. 9, there is no impact peak large enough to damage a micromechanical device mounted to the mounting pad. It can also be seen by qualitatively comparing data in FIGS. 5 and 9 that, overall, there is less impact energy at the mounting pad due to the impacts.

FIGS. 10–12 schematically illustrate a second embodiment of an assembly 400 with an elevational step on a rail corner to provide unevenness. Reference numbers used in FIGS. 10–12 that are the same as reference numbers used in FIGS. 6–8 identify the same or similar features. In FIGS. 10–12, the rail ends 334, 336 are shaped to also include mounting lugs 402, 406. The lugs 402, 406 surround threaded holes 404, 408 which are mounting holes for mounting the assembly 400 to a mounting surface (not illustrated). The lug 402 includes the elevational step 364 and does not interfere with the advantages of unevenness and impact cancellation at the mounting pad 310 described above in connection with FIGS. 6–9. The lugs 402, 406 do not protrude above the level of the adjacent rail ends 334, 336. When the assembly 400 is dropped, the rail ends 334, 336, which are shaped to be uneven, impact a flat surface at different times. In other respects, the assembly 400 in FIGS. 10–12 is similar to the assembly 300 in FIGS. 6–8.

FIGS. 13–15 illustrate a third embodiment of an assembly 500 with first and second lugs 501, 503 that are attached to the first and second rail corners 334, 336. Reference numbers used in FIGS. 13–15 that are the same as reference numbers used in FIGS. 10–12 identify the same or similar features. Grooves 550, 552 undercut the first and second lugs 501, 503 such that the first and second lugs 501, 503 are cantilevered over the base 304, without cutting a groove in the main bodies of rails 330, 332 themselves. The first and second lugs 501, 503 protrude above the first and second rail corners 334, 336. In a preferred arrangement, a housing 502 comprises a metal die casting and the cantilevered, protruding lugs 501, 503 and the first and second side rails 330, 332 are portions of the die casting. When the end of the assembly 500 is dropped and strikes a surface, the protruding first and second lugs contact the surface and there are shock impulses. The cantilevered first and second lugs 501, 503 are deflectable and spread the impulses over time. The deflectable first and second lugs 501, 503 reduce or lower peak values of the impulses. The first and second lugs 501 and 502 have corresponding first and second elevations 540, 541 that protrude beyond a rail elevation 542 to provide unevenness. The elevations 540, 541 can be the same elevation or can be elevations that are different from one another to provide unevenness. In other respects, the assembly 500 in FIGS. 13–15 is similar to the assembly 400 in FIGS. 10–12.

Figure 17:
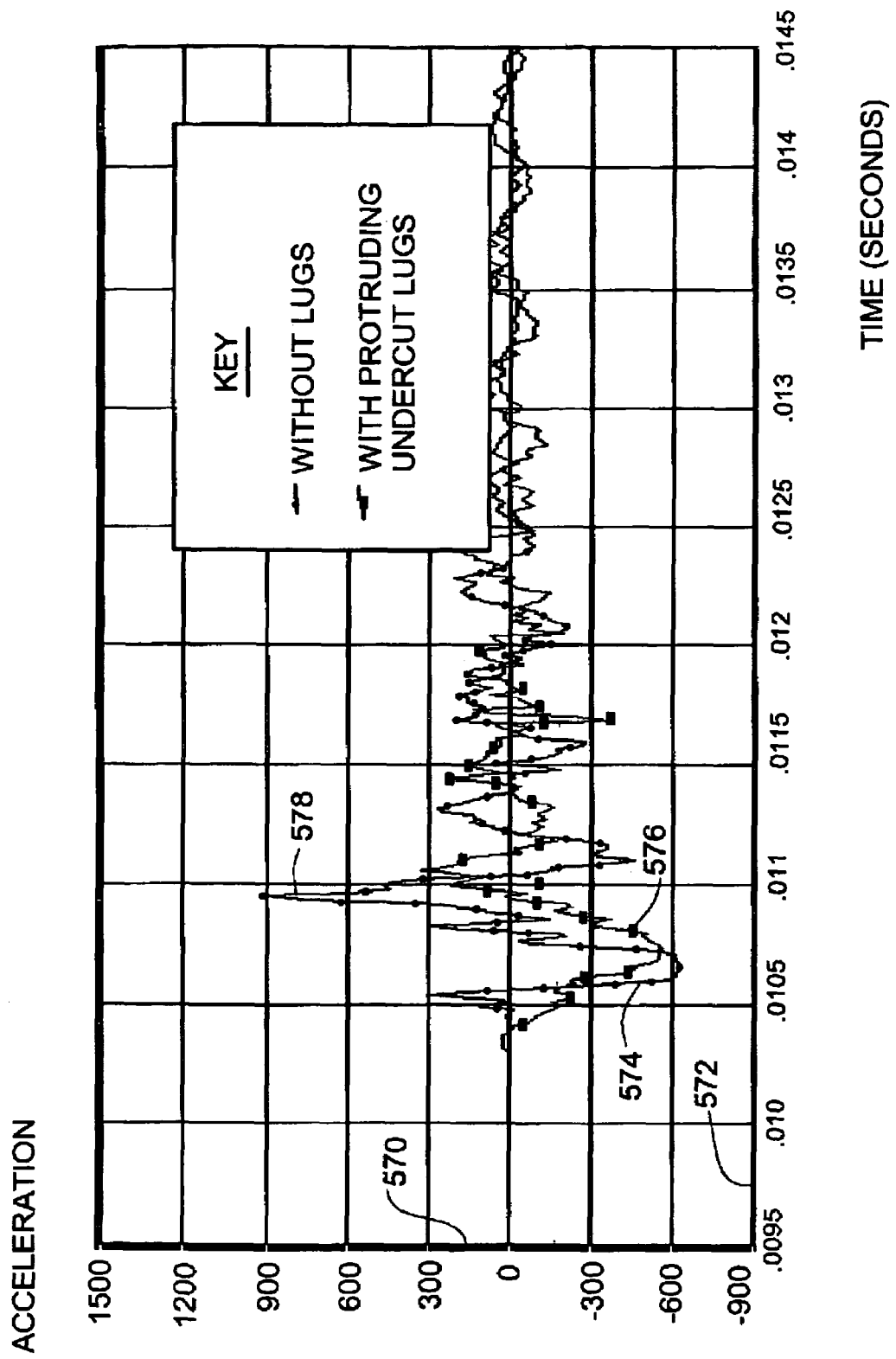
FIG. 17 illustrates a graph of accelerations due to impacts on assemblies with and without protruding, cantilevered lugs.

FIG. 17 illustrates a graph of accelerations due to impact on an assemblies with and without protruding, cantilevered lugs on a rail corner. The data in FIG. 17 is comparable to the data in FIGS. 5, 9. In FIG. 17, a vertical axis 570 represents acceleration as sensed by an accelerometers mounted at mounting pads in the disc drive housings. A horizontal axis 572 represents time in seconds. A first line 574 (identified with circular dots) represents acceleration sensed without the use of protruding undercut lugs. A second line 576 (identified with rectangles) represents acceleration sensed with the use of protruding cantilevered lugs.

As can be seen from FIG. 17, an impact (acceleration) peak 578 is present when the protruding cantilevered lugs are not used. There is no corresponding large impact peak when the protruding cantilevered lugs are used. In FIG. 17, there is no impact peak large enough to damage a micromechanical device mounted to the mounting pad when the protruding, cantilevered lugs are used. Referring back to the graph in FIG. 5, it can be seen that in FIG. 5 where the rail corners are not shaped to limit shock, there is an impact peak 284 large enough to damage a micromechanical device. Referring back to the graph in FIG. 9, there are uneven rails, and an impact peak at a mounting pad is reduced (cancelled) by the different timing of the impulses from the uneven rails. Referring to FIG. 17, cantilevered lugs change the timing of impacts by spreading them out over time, and damaging impact peaks are avoided.

Figure 18:
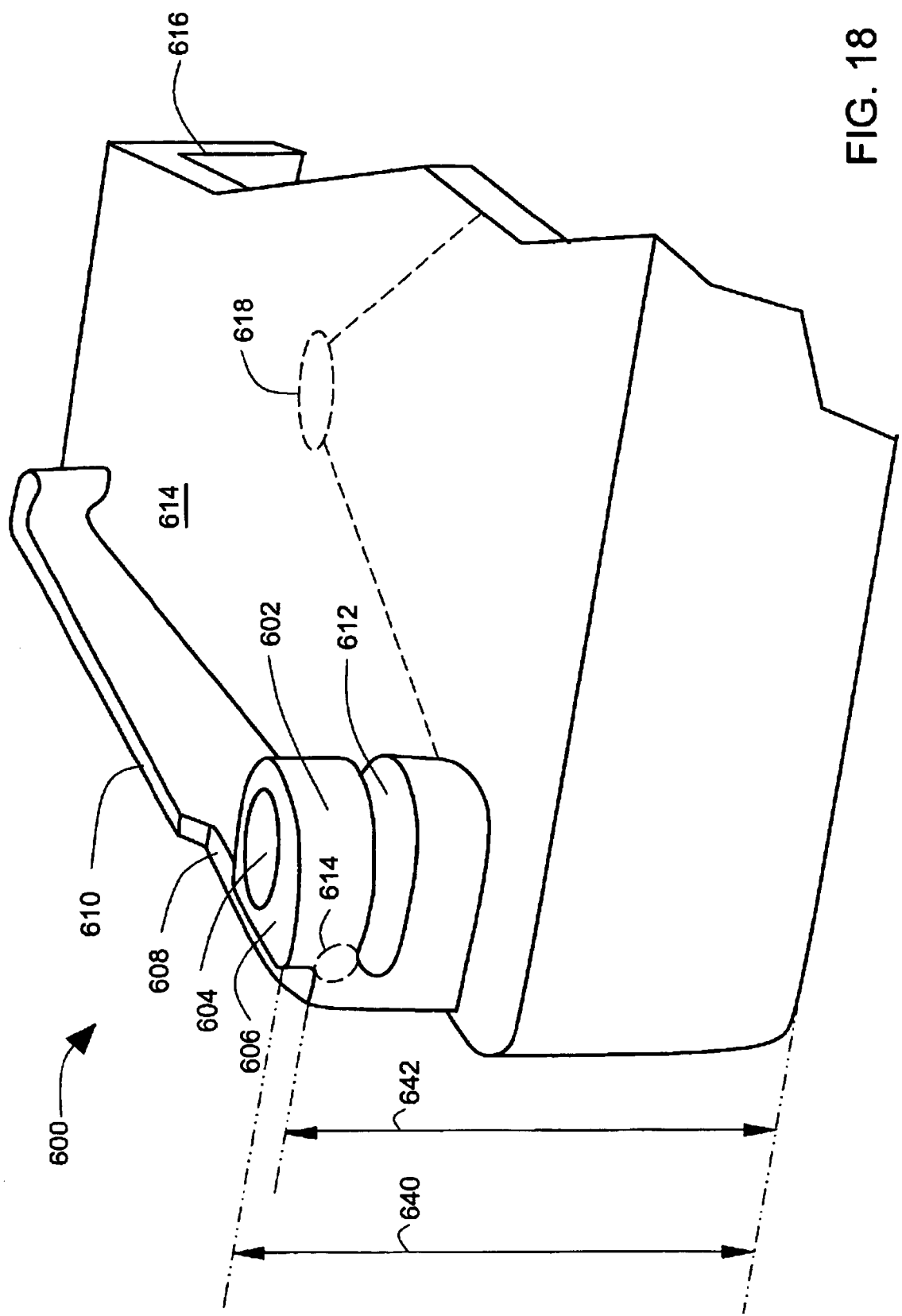
FIG. 18 schematically illustrates a fourth embodiment of an assembly with protruding, cantilevered lugs.

FIGS. 18 illustrates a partial view of a fourth embodiment of an assembly 600 with protruding, undercut lugs, only one of which is illustrated in FIG. 18. The lug 602 includes a threaded hole 604 for receiving a mounting screw. The lug 602 has an external surface 606 that protrudes above an elevational step 608 in a rail 610. The lug 602 is undercut by a slot 612 so that the lug 602 is cantilevered over a base 614.

The arrangement of the elevational step 608 and the slot 612 form a region 614 that is flexible and functions as a solid state hinge for the lug 602. When the lug 602 strikes a surface, the region 614 flexes. The flexing spreads the impact out over time and reduces the peak magnitude of acceleration that reaches a mounting pad 618. The side rail 610 is mounted to the base 614 that is part of a housing 616. The mounting pad 618 is also mounted to the base 614 and serves as a mounting point for an acceleration-sensitive micromechanical assembly that is protected from shock by the protruding, undercut lugs. The impact absorber design feature significantly reduces the chance of damaging the drive when dropped during manufacturing and customer integration handling. The mounting lug 602 has a elevation 640 and the elevational step 608 has an elevation 642 that is different than elevation 640 to provide unevenness.

Features illustrated in one embodiment can be appropriately combined with features shown in another embodiment to meet the needs of a particular application.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the assembly while maintaining substantially the same functionality without departing from the scope of the present invention. In addition, although the preferred embodiment described herein is directed to a disc drive system for data storage, it will be appreciated by those skilled in the art that the teachings of the present invention can be applied to other assemblies of micromechanical components, without departing from the scope of the present invention.

What is claimed is:

1. An assembly, comprising:
   a housing including pivotal mounting holes defining a mounting axis and including a base and a mounting pad on the base;
   a micromechanical device coupled to the mounting pad; and
   first and second side rails extending from the base to form first and second rail corners subject to striking a surface, as the housing pivots around the mounting axis when the housing is dropped, the first and second rail corners having first and second elevations that are uneven to reduce impacts reaching the micromechanical device.

2. The assembly of claim 1 comprising an elevational step in the second rail corner changing an elevation of the second rail corner relative to an elevation of the first rail corner to provide unevenness.

3. The assembly of claim 2 wherein the unevenness controls relative times that the impacts reach the micromechanical device.

4. The assembly of claim 1 wherein the impacts are oscillatory and a second peak impulse from the second rail corner arrives at the mounting pad out of phase with a first peak impulse from the first rail corner, providing at least partial cancellation of the first and second peak impulses at the mounting pad.

5. The assembly of claim 1 wherein the first and second side rails further comprise mounting lugs.

6. The assembly of claim 5 wherein the mounting lugs are cantilevered over the base.

7. The assembly of claim 6 wherein the mounting lugs protrude above the first and second rail corners.

8. The assembly of claim 6 wherein the housing comprises a metal die casting and the first and second side rails are portions of the die casting.

9. The assembly of claim 6 wherein the mounting lugs are deflectable and spread the impulses over time.

10. The assembly of claim 6 wherein the mounting lugs are deflectable and lower peak values of the impulses reaching the micromechanical device.

11. The assembly of claim 6 wherein the assembly comprises a disc drive assembly, and the micromechanical device comprises a disc.

12. The assembly of claim 6 wherein the assembly comprises a disc drive and the micromechanical device comprises a read/write head.

13. The assembly of claim 6 wherein the mounting lugs have corresponding first and second lug elevations that are different from one another.

14. A method of manufacturing an assembly, comprising:
   providing a housing with pivotal mounting holes defining a mounting axis, a base and a mounting pad on the base;
   mounting a micromechanical device to the mounting pad;
   providing first and second side rails extending from the base to form first and second rail corners subject to striking a surface as the housing pivots around the mounting axis when the housing is dropped, and
   adjusting a shape of at least one of the first and second rail corners to provide first and second rail elevations that are uneven to provide a reduction of impacts reaching the micromechanical device.

15. The method of claim 14 wherein the adjusting comprises thinning a portion of the second rail to form an elevational step extending to the second rail corner.

16. The method of claim 14 wherein the reduction comprises at least partial cancelling of first and second peak impacts from the first and second rail corners by providing the first and second peak impacts out of phase at the mounting pad.

17. The method of claim 14 comprising controlling the relative times with a spacing difference between elevations on the first and second rail corners.

18. The method of claim 14 further comprising cantilevering mounting lugs over the base.

19. The method of claim 14 wherein the mounting lugs protrude above the first and second rail corners.

20. The method of claim 14 wherein the assembly comprises a disc drive assembly, and the micromechanical device comprises a disc.

21. The method of claim 14 wherein the assembly comprises a disc drive and the micromechanical device comprises a read/write head.

22. An assembly, comprising:
   a housing including pivotal mounting holes defining a mounting axis and including a base and a mounting pad on the base; a micromechanical device coupled to the mounting pad; and first and second side rails extending from the base to form first and second rail corners subject to striking a surface as the housing pivots around the mounting axis when the housing is dropped; and
   unevenness in the elevation of the first and second rail corners relative to the struck surface to control relative times at which impacts reach the micromechanical device.

23. The assembly of claim 22 wherein the means for controlling comprises an elevational step thinning a portion of one of the rails, the elevational step extending to the rail corner.

24. The assembly of claim 22 wherein the means for controlling comprises mounting lugs attached to the rail corners and cantilevered over the base.

25. A method of shock cancellation, comprising:
providing a housing including pivotal mounting holes defining a mounting axis and including a base and a mounting pad on the base;
providing a micromechanical device coupled to the mounting pad; and
providing first and second side rails extending from the base to form first and second rail corners subject to shocks upon striking a surface;
providing the first and second rail corners with first and second elevations that, when the housing pivots around the mounting axis when the housing is dropped, are uneven to provide shocks that are spaced apart in time in order to at least partially cancel the shocks reaching the mounting pad.

26. The method of claim 25 wherein the shocks have damped oscillatory waveshapes and the cancellation of the shocks at the mounting pad is due to subtractive interference of the damped oscillatory waveshapes.

27. The method of claim 25 wherein the shocks are oscillatory and a second peak impulse from the second rail corner arrives at the mounting pad out of phase with a first peak impulse from the first rail corner, providing at least partial cancellation of the first and second peak impulses at the mounting pad.

* * * * *